(12) United States Patent
Chen

(10) Patent No.: US 11,759,732 B2
(45) Date of Patent: Sep. 19, 2023

(54) WATER CLEANER

(71) Applicant: NingBo Poolstar Pool Products Co.,Ltd, Zhejiang (CN)

(72) Inventor: Liang Chen, Zhejiang (CN)

(73) Assignee: NingBo Poolstar Pool Products Co., Ltd, Ningbo (CN)

( * ) Notice: Subject to any disclaimer, the term of this patent is extended or adjusted under 35 U.S.C. 154(b) by 41 days.

(21) Appl. No.: 17/401,902

(22) Filed: Aug. 13, 2021

(65) Prior Publication Data

US 2022/0001308 A1  Jan. 6, 2022

(51) Int. Cl.
| | |
|---|---|
| *B01D 29/56* | (2006.01) |
| *C02F 1/00* | (2023.01) |
| *B01D 35/30* | (2006.01) |
| *B01D 29/11* | (2006.01) |
| *B01D 35/26* | (2006.01) |
| *B01D 35/28* | (2006.01) |
| *C02F 103/42* | (2006.01) |

(52) U.S. Cl.
CPC ............ *B01D 29/56* (2013.01); *B01D 29/114* (2013.01); *B01D 35/26* (2013.01); *B01D 35/28* (2013.01); *B01D 35/30* (2013.01); *C02F 1/001* (2013.01); *B01D 2201/204* (2013.01); *B01D 2201/282* (2013.01); *B01D 2201/30* (2013.01); *B01D 2201/605* (2013.01); *C02F 2103/42* (2013.01)

(58) Field of Classification Search
CPC ...... B01D 29/56; B01D 29/114; B01D 35/26; B01D 35/28; B01D 35/30; B01D 2201/204; B01D 2201/282; B01D 2201/30; B01D 2201/605; B01D 29/21; B01D 35/153; C02F 1/001; C02F 2103/42; C02F 2201/006
USPC ...... 210/258, 167.1, 167.12, 167.15, 167.16, 210/172.4, 172.6, 30, 5, 320, 416.1, 210/416.2, 446
See application file for complete search history.

(56) References Cited

U.S. PATENT DOCUMENTS

| | | | |
|---|---|---|---|
| 9,903,133 B2 | 2/2018 | Bruneel | |
| 10,030,403 B2 | 7/2018 | Bruneel | |
| 2005/0035039 A1* | 2/2005 | Erlich | E04H 4/1636 210/167.16 |
| 2011/0203099 A1* | 8/2011 | Curt | B01D 29/96 210/232 |
| 2018/0135327 A1* | 5/2018 | Bruneel | E04H 4/1672 |

FOREIGN PATENT DOCUMENTS

| | | |
|---|---|---|
| CN | 212141644 U | 12/2020 |
| CN | 212491757 U | 2/2021 |

* cited by examiner

*Primary Examiner* — Madeline Gonzalez

(57) ABSTRACT

A water cleaner, including a housing and a filter mechanism. Two ends of the housing are provided with a first inlet and a first outlet, respectively. The filter mechanism is arranged in the housing. A first end and/or an outer circumference of the filter mechanism are/is provided with a second inlet, and a second end is provided with a second outlet. The sewage flows into the housing through the first inlet and flows towards the filter mechanism to be filtered. The obtained clean water flows into the filter mechanism through the second inlet and flows out of the housing through the second outlet and the first outlet in sequence. The first end of the filter mechanism is close to the first inlet, and the second end is close to the first outlet.

5 Claims, 2 Drawing Sheets

WATER CLEANER

CROSS-REFERENCE TO RELATED APPLICATIONS

This application claims the benefit of priority from Chinese Patent Application No. 202020681045.0, filed on Apr. 28, 2020. The content of the aforementioned application, including any intervening amendments thereto, is incorporated herein by reference in its entirety.

TECHNICAL FIELD

This application relates to water cleaning equipment, in particular to a water cleaner.

BACKGROUND

Mesh bags or stainless steel filter screens are usually used as the filtering mechanism of the existing water cleaners. However, these filtering mechanisms generally struggle with limited internal space and insufficient dirt-holding capacity, so that the internal space will be easily filled with dirt in the sewage after a period of use, causing the clogging of the filter holes. As a consequence, the filter mechanism cannot effectively filter the sewage flowing through, significantly weakening the purification performance and efficiency of the water cleaner.

SUMMARY

In view of this, it is necessary to provide a water cleaner including a filter mechanism with significantly improved dirt-holding capacity.

Technical solutions of this application are described as follows.

This application provides a water cleaner, comprising:
a housing; and
a filter mechanism;
where one end of the housing is provided with a first inlet, and the other end of the housing is provided with a first outlet; and the filter mechanism is arranged in the housing; a first end and/or an outer circumference of the filter mechanism is provided with a second inlet, and a second end of the filter mechanism is provided with a second outlet; sewage to be treated flows into the housing through the first inlet and flows toward the filter mechanism to be filtered to obtain a clean water; the clean water flows into the filter mechanism through the second inlet, and then passes through the second outlet and the first outlet in sequence to flow out of the housing; the first end of the filter mechanism is an end close to the first inlet, and the second end of the filter mechanism is an end close to the first outlet.

In an embodiment, the filter mechanism comprises a support cylinder and a filter cartridge; a first end and/or an outer circumference of the support cylinder is provided with the second inlet, and a second end of the support cylinder is provided with the second outlet; the filter cartridge is arranged around an area of the support cylinder provided with the second inlet; the sewage to be treated flows toward the filter cartridge to be filtered by the filter cartridge to obtain the clean water; the clean water flows into the support cylinder through the second inlet; the first end of the support cylinder is an end of the support cylinder close to the first inlet; and the second end of the support cylinder is an end of the support cylinder close to the first outlet.

In an embodiment, the first end and the outer circumference of the support cylinder are both provided with the second inlet; the filter cartridge is arranged around the outer circumference of the support cylinder; the filter mechanism further comprises a sealing cover; and the second inlet at the first end of the support cylinder is sealed by the sealing cover to prevent the sewage to be treated from flowing into the support cylinder through the second inlet at the first end of the support cylinder.

In an embodiment, the water cleaner further comprising:
an impeller assembly;
where the impeller assembly is arranged in the housing, and is located between the support cylinder and the first outlet; the impeller assembly is configured to suck the sewage to be treated such that the sewage to be treated flows into the housing through the first inlet and flows towards the filter cartridge; and the impeller assembly is also configured to suck the clean water to allow the clean water to flow out of the support cylinder through the second outlet.

In an embodiment, the impeller assembly comprises a driving part and an impeller; the driving part is arranged in the housing, and is provided with a rotating shaft; the impeller is arranged on the rotating shaft; and the driving part is configured to drive the impeller to rotate with respect to an axial direction of the rotating shaft through the rotating shaft, so that the impeller generates a centrifugal force for sucking the sewage to be treated and the clean water.

In an embodiment, the housing comprises a first housing, a second housing and an auxiliary part; a first accommodating cavity is provided in the first housing, and a second accommodating cavity is provided in the second housing; the first housing is connected with the second housing through the auxiliary part, and the first accommodating cavity is separated from the second accommodating cavity by the auxiliary part and the; an end of the first housing away from the second housing is provided with the first inlet and an end of the second housing away from the first housing is provided with the first outlet; the filter mechanism is arranged in the first accommodating cavity; a main body of the driving part is arranged at a side of the auxiliary part facing the second accommodating cavity; the rotating shaft of the driving part passes through the auxiliary part and extends into the first accommodating cavity; the impeller is arranged in the first accommodating cavity; the auxiliary part is provided with a through hole communicating the first accommodating cavity and the second accommodating cavity; when the driving part drives the impeller to rotate, the sewage to be treated is sucked to flow into the first accommodating cavity through the first inlet and flow towards the filter cartridge to be filtered to obtain the clean water; the clean water passes through the second outlet, a gap of the impeller and the through hole in sequence to flow into the second accommodating cavity, and then flows out through the first outlet.

In an embodiment, the water cleaner, further comprising:
a water-retaining assembly;
where the water-retaining assembly is arranged in the first accommodating cavity, and encloses the impeller and the rotating shaft; and the water-retaining assembly is configured to block the sewage to be treated in the first accommodating cavity from flowing towards the impeller.

In an embodiment, the water-retaining assembly comprises a first water-retaining component and a second water-retaining component connected with each other; an end of the first water-retaining component away from the second water-retaining component is connected with the second end of the support cylinder; the first water-retaining component is arranged surrounding the impeller; an end of the second water-retaining component connected to the first water-retaining component is provided with a first water connection port; the first water connection port is communicated with the gap of the impeller; an end of the second water-retaining component away from the first water-retaining component is provided with a second water connection port; the second water connection port is communicated with the through hole; and the second water-retaining component is configured for guiding transportation of the clean water between the gap of the impeller and the through hole.

In an embodiment, an end of the housing away from the first outlet is bent inward and extends to form a diversion tube; and an opening of an end of the diversion tube close to the first outlet constitutes the first inlet.

In an embodiment, an auxiliary cavity is formed between the diversion tube and an inner side wall of the housing, and is configured to accommodate dirt in the sewage to be treated.

Compared with the prior art, the water cleaner provided herein has the following beneficial effects.

In use, the untreated sewage can flow into the housing through the first inlet and then flow towards the filter mechanism to be filtered. The obtained clean water flows into the filter mechanism through the second inlet, and then flows out of the housing through the second outlet and the first outlet in sequence, so as to complete the purification treatment of the sewage. In this application, the filter mechanism can prevent the dirt in the sewage from entering the filter mechanism, so that the space in the housing can be fully utilized to accommodate the dirt in the sewage, thereby effectively improving the dirt-holding capacity of the filter mechanism. As a consequence, the filtering efficiency of the filter mechanism is enhanced, facilitating improving the purification performance and efficiency of the water cleaner.

BRIEF DESCRIPTION OF THE DRAWINGS

In order to clearly explain the technical solutions in the embodiments of the present application or the prior art, the drawings that need to be used in the description of the embodiments or the prior art are briefly described below Obviously, illustrated in the drawings are merely some embodiments of the present application. For those of ordinary skill in the art, other drawings can be obtained based on these drawings without paying creative effort.

DETAILED DESCRIPTION OF EMBODIMENTS

Figure 1:
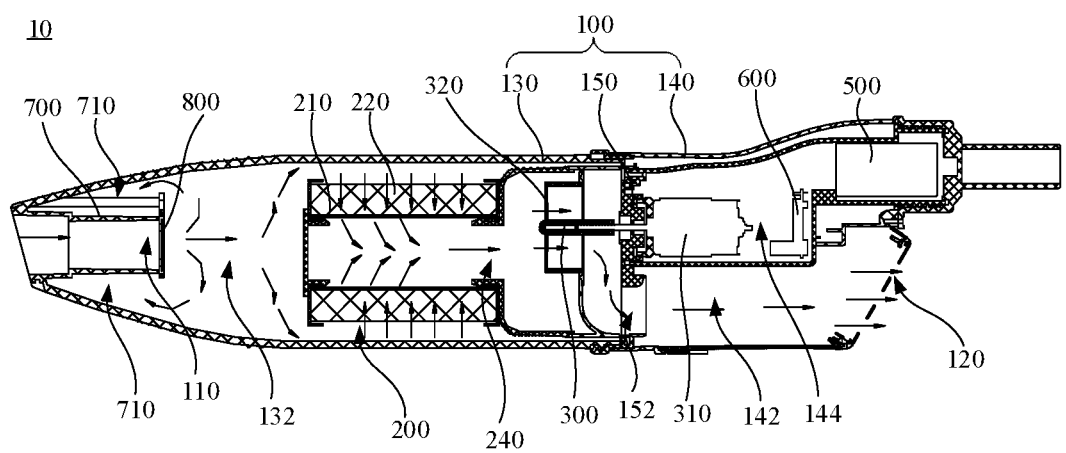
FIG. 1 is a cross-sectional view of a water cleaner according to an embodiment of the disclosure.

This application will be described in detail below with reference to the accompanying drawings and embodiments to facilitate the understanding of the technical solutions of the disclosure. Presented in the drawings are merely preferred embodiments of the disclosure, which are illustrative of the technical solutions of the disclosure, and are not intended to limit the disclosure.

It should be noted that when a component is recited to be "fixed" to another component, it can be directly fixed on another component or indirectly fixed on another component through an intermediate component. When a component is considered to be "connected" to another component, it can be directly connected to another component or indirectly connected to another component through an intermediate component. As used herein, the terms "vertical", "horizontal", "left", "right" and similar expressions are merely illustrative, and are not intended to limit the implementation.

Unless otherwise specified, all technical and scientific terms used herein have the same meaning as commonly understood by those skilled in the art. The terms used in the description are only descriptive, and are not intended to limit the application. The term "and/or" as used herein includes all combinations of one or more listed items.

Figure 2:
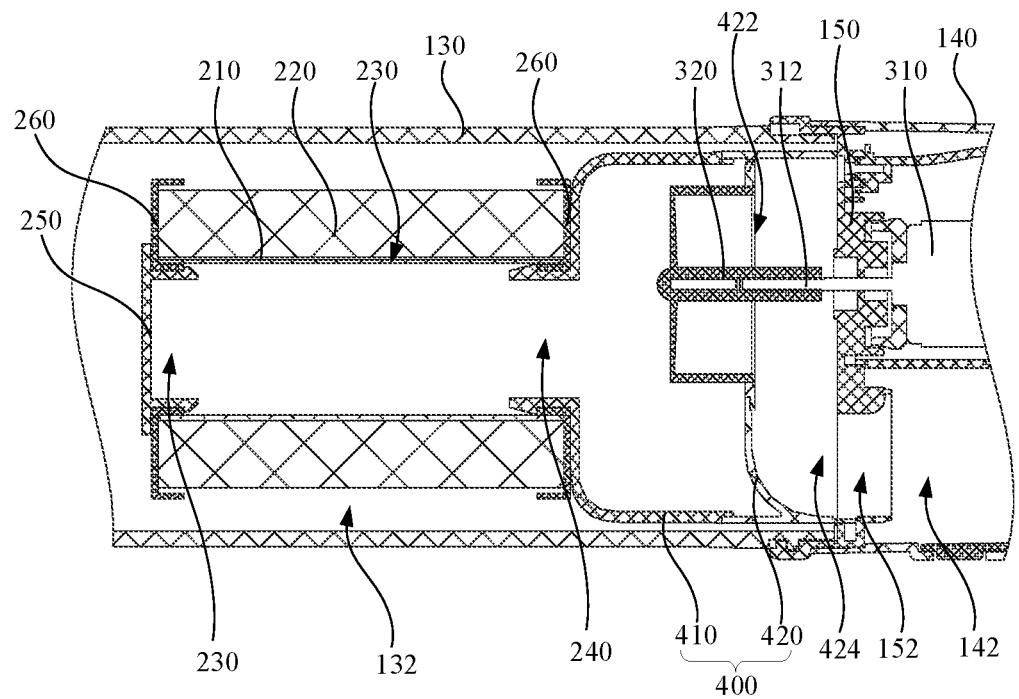
FIG. 2 is a partial cross-sectional view of the water cleaner according to an embodiment of the disclosure.

As shown in FIGS. 1 and 2, an embodiment of the present application provides a water cleaner 10 for water purification in a pool. The water cleaner 10 includes a housing 100 and a filter mechanism 200, wherein one end of the housing 100 is provided with a first inlet 110, and the other end of the housing is provided with a first outlet 120. The filter mechanism 200 is arranged in the housing 100. The sewage to be treated flows into the housing 100 through the first inlet 110 and flows toward the filter mechanism 200 to be filtered to obtain a clean water, which flows out of the housing 100 through the first outlet 120, thereby achieving the purification of the sewage.

In an embodiment, a first end and/or an outer circumference of the filter mechanism 200 is provided with a second inlet 230, and a second end of the filter mechanism 200 is provided with a second outlet 240. The sewage to be treated flows into the housing 100 through the first inlet 110 and flows toward the filter mechanism 200 to be filtered to obtain a clean water, which flows into the filter mechanism 200 through the second inlet 230, and then passes through the second outlet 240 and the first outlet 120 in sequence to flow out of the housing 100. The first end of the filter mechanism 200 is an end close to the first inlet 110, and the second end of the filter mechanism 200 is an end close to the first outlet 120. Since the filtering mechanism 200 can intercept the dirt in the sewage to the outside and make full use of the accommodating space in the housing 100 to store the dirt in the sewage, thereby effectively improving the dirt-holding capacity and ensuring that the sewage is effectively filtered by the filtering mechanism 200, so as to enhance the purification performance and efficiency of the water cleaner 10.

In an embodiment, the filter mechanism 200 includes a support cylinder 210 and a filter cartridge 220. A first end and/or an outer circumference of the support cylinder 210 is provided with the second inlet 230, and a second end of the support cylinder is provided with the second outlet 240. The filter cartridge 220 is arranged around an area of the support cylinder 210 provided with the second inlet 230. The sewage to be treated flows toward the filter cartridge 220 to be filtered by the filter cartridge 220 to obtain the clean water; the clean water flows into the support cylinder 210 through the second inlet 230. The first end of the support cylinder 210 is an end of the support cylinder 210 close to the first inlet 110, and the second end of the support cylinder is an end of the support cylinder close to the first outlet 120.

In some embodiments, the support cylinder 210 can be arranged outside the filter cartridge 220 to support the filter cartridge 220. In addition, in some embodiments, when the strength of the filter cartridge 220 is strong enough, it is not necessary to provide the support cylinder 210.

As shown in FIG. 2, in an embodiment, the first end and the outer circumference of the support cylinder 210 are both provided with the second inlet 230. The filter cartridge 220 is arranged around the outer circumference of the support cylinder 210. The filter mechanism 200 further includes a sealing cover 250, and the second inlet 230 at the first end of the support cylinder 210 is sealed by the sealing cover 250. Specifically, the sealing cover 250 is clamped in the second inlet 230 at the first end of the support cylinder 210 to prevent the sewage to be treated from flowing into the support cylinder 210 through the second inlet 230, thereby preventing the sewage from directly flowing out of the housing 100 through the second outlet 240 and the first outlet 120 to ensure the purification quality of the water cleaner 10. In some embodiments, when the first end of the support cylinder 210 is a closed end, the sealing cover 250 can be omitted.

In some embodiments, when both of the first end and the outer circumference of the support cylinder 210 are provided with a second inlet 230, the first end and the outer circumference of the support cylinder 210 are both provided with a filter cartridge 220, so as to realize that the water can flow into the support cylinder 210 from multiple parts of the support cylinder 210 simultaneously, under the condition that the water is filtered enough to enter the support cylinder 210, and further achieve the purpose of effectively enhancing the purification performance and efficiency of the water cleaner 10. Specifically, in an embodiment, the second inlet 230 on the outer circumference of the support cylinder 210 includes a plurality of sub water inlet holes, and the plurality of sub water inlet holes are arranged on the outer circumference of the support cylinder 210 at intervals.

As shown in FIG. 2, in an embodiment, the filter mechanism 200 further includes an end cap 260. The end cap 260 is set at the first end and/or the second end of the support cylinder 210, and the filter cartridge 220 is fixed to the support cylinder 210 through the end cap 260. In this embodiment, the end caps 260 are provided at the first end and the second end of the support cylinder 210 to improve the fixing stability of the filter cartridge 220 relative to the support cylinder 210. Specifically, the end cap 260 is clamped in the second inlet 230 at the first end and the second outlet 240 at the second end of the support cylinder 210.

It should be noted that, in this embodiment, the filter cartridge 220 can be but not limited to filter paper. It should be understood that, in other embodiments, the filter cartridge 220 can be a cotton filter layer or made of other materials that have the function of retaining the dirt.

In an embodiment, the outer wall of the filter cartridge 220 is folded to form wrinkles, which can effectively increase the contact area between the filter cartridge 220 and the sewage, thereby improving the filtering effect of the filter cartridge 220.

Figure 3:
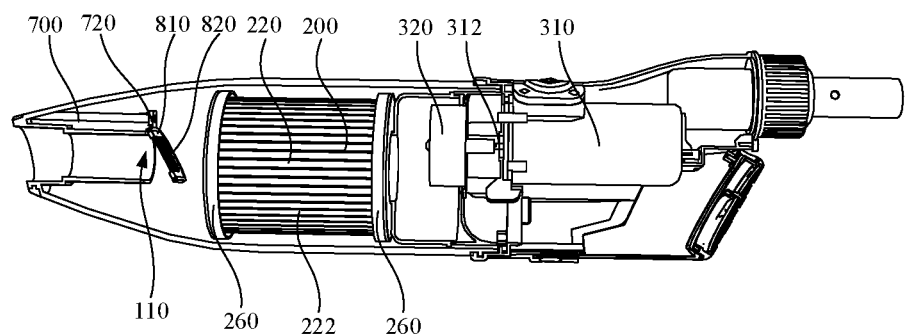
FIG. 3 is a partial structural diagram of the water cleaner according to an embodiment of the disclosure.

As shown in FIG. 3, in an embodiment, the outer wall of the filter cartridge 220 is folded to form a plurality of strip-shaped protrusions 222 arranged side by side to increase the contact area between the filter cartridge 220 and the sewage. Specifically, the strip-shaped protrusions 222 extends along the axial direction of the support cylinder 210.

As shown in FIG. 1, in an embodiment, the water cleaner 10 further includes an impeller assembly 300, where the impeller assembly 300 is arranged in the housing 100, and is located between the support cylinder 210 and the first outlet 120. The impeller assembly 300 is configured to suck the sewage such that the sewage flows into the housing 100 through the first inlet 110 and flows towards the filter cartridge 220, and the impeller assembly is also configured to suck the clean water to allow the clean water to flow out of the support cylinder 210 through the second outlet 240.

As shown in FIGS. 1 and 2, the impeller assembly 300 includes a driving part 310 and an impeller 320. The driving part 310 can be but not limited to a motor. The driving part 310 is arranged in the housing 100, and is provided with a rotating shaft 31. The impeller 320 is arranged on the rotating shaft 312. The driving part 310 is used to drive the impeller 320 to rotate axially around the rotating shaft 312 through the rotating shaft 312, so that the impeller 320 generates centrifugal force for sucking sewage and clean water.

In an embodiment, the housing 100 includes a first housing 130, a second housing 140 and an auxiliary part 150. A first accommodating cavity 132 is provided in the first housing 130, and a second accommodating cavity 142 is provided in the second housing 140. The first housing 130 is connected with the second housing 140 through the auxiliary part 150, and the first accommodating cavity 132 is separated from the second accommodating cavity 142 by the auxiliary part 150. An end of the first housing 130 away from the second housing 140 is provided with the first inlet 110, and an end of the second housing 140 away from the first housing 130 is provided with the first outlet 120. The filter mechanism 200 is arranged in the first accommodating cavity 132. A main body of the driving part 310 is arranged at a side of the auxiliary part 150 facing the second accommodating cavity 142. The rotating shaft 312 of the driving part 310 passes through the auxiliary part 150 and extends into the first accommodating cavity 132. The impeller 320 is arranged in the first accommodating cavity 132. The auxiliary part 150 is provided with a through hole 152 communicating the first accommodating cavity 132 and the second accommodating cavity 142.

Specifically, when the driving part 310 drives the impeller 320 to rotate, the sewage to be treated is sucked to flow into the first accommodating cavity 132 through the first inlet 110 under the centrifugal force of the impeller 320 and flow toward the filter cartridge 220. In the process of the sewage being sucked into the first accommodating cavity 132, large and heavy dirt (such as sand, fallen leaves, etc.) in the sewage will be trapped in the first accommodating cavity 132 in advance. At the same time, the remaining water and small and light dirt (such as dust) in the sewage will flow to the filter cartridge 220. The small and light dirt will be further intercepted by the filter cartridge 220. However, the clean water will enter the support cylinder 210 from the upward second inlet 230 on the circumferential direction of the support cylinder 210. Then, the clean water flows into the second accommodating cavity 142 through the second outlet 240, the gap of the impeller 320, and the through hole 152 in sequence, and finally flows out through the outlet 120, so as to achieve the purification treatment effect of the water cleaner 10 on sewage.

As shown in FIG. 2, in an embodiment, the water cleaner 10 further includes a water-retaining assembly 400, which is arranged in the first accommodating cavity 132, and is enclosed outside the impeller 320, and the rotating shaft 312 to block the water. The water-retaining assembly 400 is used to block the flow of the sewage to be treated in the first accommodating cavity 132 from flowing towards the impeller 320, thereby preventing the unfiltered sewage from directly flowing into the second accommodating cavity 142 through the gap and through holes 152 of the impeller 320 and finally flowing out through the first outlet 120 to ensure the purification quality of the sewage.

As shown in FIG. 2, in an embodiment, the water-retaining assembly 400 includes a first water-retaining component 410 and a second water-retaining component 420 connected with each other. The end of the first water-retaining component 410 away from the second water-retaining component 420 is connected to the second end of the support cylinder 210. In this embodiment, the end of the first water-retaining component 410 away from the second water-retaining component 420 is clamped in the second outlet 240 at the second end of the support cylinder 210. The first water-retaining component 410 is enclosed outside the impeller 320.

The water-retaining assembly 400 includes a first water-retaining component 410 and a second water-retaining component 420 connected with each other; an end of the first water-retaining component 410 away from the second water-retaining component 420 is connected with the second end of the support cylinder 210. In the embodiment, the end of the first water-retaining component 410 away from the second water-retaining 420 is clamped in the second outlet 240 at the second end of the support cylinder 210. The first water-retaining component 410 is enclosed outside the impeller 320.

An end of the second water-retaining component 420 connected to the first water-retaining component 410 is provided with a first water connection port 422, and the first water connection port 422 is communicated with the gap of the impeller 320. An end of the second water-retaining component 420 away from the first water-retaining component 410 is provided with a second water connection port 424. The second water connection port 424 is communicated with the through hole 152. The second water-retaining component 420 is configured for guiding transportation of the clean water between the gap of the impeller 320 and the through hole 152.

As shown in FIG. 1, in an embodiment, the water cleaner 10 further includes a power supply 500 which is arranged in the housing 100 and electrically connected to the driving part 310. The power supply 500 is used to supply power to the driving part 310. In an embodiment, the water cleaner 10 further includes a controller 600 which is arranged in the housing 100 and is electrically connected to the driving part 310. The controller 600 is used to control the activation and deactivation of the driving part 310.

In an embodiment, the power supply 500 can be but not limited to a battery. The power supply 500 and the controller 600 are arranged in the second accommodating cavity 142. Furthermore, an electric control cavity 144 is formed in the second accommodating cavity 142. The main body of the driving part 310, the power supply 500, and the controller 600 are arranged in the electric control cavity 144 to prevent the clean water flowing into the second accommodating cavity 142 from directly contacting the above-mentioned electrical components, avoiding causing short circuits of the electrical components.

As shown in FIGS. 1 and 3, in an embodiment, the end of the housing 100 away from the first outlet 120 is bent inward to form a diversion tube 700. The opening of the diversion tube 700 relatively close to the end of the first outlet 120 is formed into the first inlet 110. Specifically, the diversion tube 700 is formed at the end of the first housing 130 away from the second housing 140.

As shown in FIG. 1, in an embodiment, an auxiliary cavity 710 is formed between the diversion tube 700 and the inner side wall of the housing 100. The auxiliary cavity 710 is used to accommodate large and heavy dirt in the sewage. Specifically, in this embodiment, an auxiliary cavity 710 is formed between the diversion tube 700 and the inner side wall of the first housing 130. The auxiliary cavity 710 is formed in the first accommodating cavity 132, and the auxiliary cavity 710 is arranged on both sides of the diversion tube 700.

As shown in FIGS. 1 and 3, in an embodiment, the water cleaner 10 further includes a filter part 800, which is arranged at the first inlet 110 of the housing 100. The filter part 800 is used for discharging the water remaining in the housing 100 to the outside of the housing 100 and preventing the remaining dirt in the housing 100 from flowing out of the housing 100 through the first inlet 110, when the water cleaner 10 stops purifying the sewage and is transferred from the sewage.

The filter part 800 can discharge the water remaining in the housing 100 to the outside of the housing 100 by providing a filter part 800 at the first inlet 110 of the housing 100, when the water cleaner 10 stops purifying sewage and gets rid of the sewage. Therefore, the weight of the used water cleaner 10 can be effectively reduced, and it is convenient for users to transfer the water cleaner 10 after using. And the filter part 800 can also effectively block the remaining sewage in the housing 100 obtained after the use of the water cleaner 10 from flowing outside the housing 100 through the first inlet 110, so as to prevent the discharged dirt from polluting the external environment or returning to the sewage to be treated, which causes the secondary pollution of the sewage.

As shown in FIGS. 1 and 3, the filter part 800 is arranged at an end of the diversion tube 700 relatively close to the first outlet 120.

Figure 4:
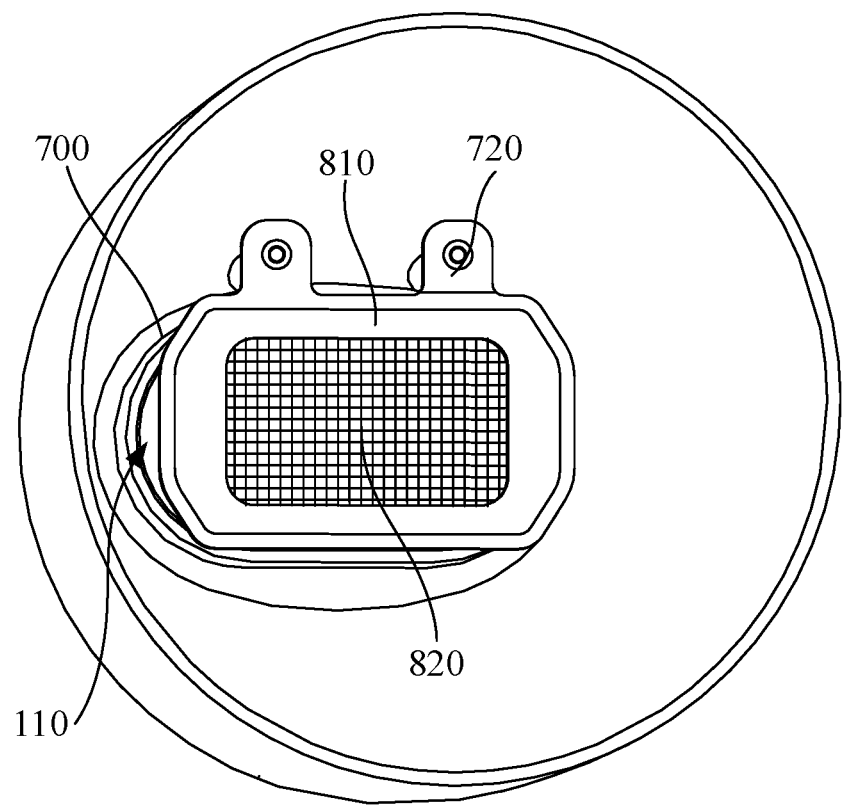
FIG. 4 is another partial structural diagram of the water cleaner according to an embodiment of the disclosure.

As shown in FIGS. 3 and 4, the filter part 800 includes an opening-closing baffle 810 and a filter screen 820. The opening-closing baffle 810 is arranged at an end of the diversion tube 700 close to the first outlet 120. The opening-closing baffle 810 is used to open or close the first inlet 110. The filter screen 820 is arranged on the opening-closing baffle 810, and is used to allow the water remaining in the housing 100 to be discharged and block the dirt remaining in the housing 100 from being discharged to the outside of the housing 100 through the first inlet 110 when the first inlet 110 is blocked by the opening-closing baffle 810 and the water cleaner 10 stops running.

Specifically, when the water cleaner 10 needs to be used to treat the sewage, the first inlet 110 can be opened by the opening-closing the baffle 810, which leads the water to flow into the housing 100 through the first inlet 110, and then the purification for the sewage will be implemented by the filter mechanism. When it is necessary to stop the purification of sewage by the water cleaner 10 and make the water cleaner 10 get rid of the sewage, the first inlet 110 can be closed by the opening and closing baffle 810. At this time, there is no sewage outside the water cleaner 10 can flow into the housing 100 through the first inlet 110. The remaining water in the housing 100 can be discharged to the outside of the housing 100 through the filter screen 820 provided on the opening-closing baffle 810, which can effectively reduce the weight of the water cleaner 10 and it is convenient for users to transfer the water cleaner 10 after use. At the same time, the filter screen 820 can also effectively block the remaining sewage in the housing 100 obtained after the use of the water cleaner 10 from flowing out of the housing 100 through the first inlet 110, so as to prevent the discharged dirt from polluting the external environment or returning to the sewage to be treated, which causes the secondary pollution of the sewage.

As shown in FIGS. 3 and 4, the opening-closing baffle 810 is rotatably arranged at an end of the diversion tube 700 relatively close to the first outlet 120 to open or close the first inlet 110.

Specifically, when the water cleaner 10 is in a non-operating state and there is no sewage flowing towards the inside of the housing 100 through the inlet 110, the opening-closing baffle 810 can abut against the end of the diversion tube 700 relatively close to the first outlet 120 under the action of gravity to block the first inlet 110, thereby closing the first inlet 110 by the opening-closing baffle 810. When the water cleaner 10 is working, and the sewage flows into the housing 100 through the first inlet 110, the sewage can overcome the gravity of the opening-closing baffle 810 to open the opening-closing baffle 810, so as to realize the opening of the first inlet 110 by the opening-closing baffle 810.

As shown in FIGS. 3 and 4, a reinforcing rib 720 is arranged on the upper side of the end 700 relatively close to the first outlet 120 of the diversion tube, and the opening-closing baffle 810 is rotatably arranged on the reinforcing rib 720, so as to realize the rotational connection between the end close to the first outlet 120 of the diversion tube and the opening-closing baffle 810. In some embodiments, a connecting shaft can be arranged on the upper side of the end relatively close to the outlet 120 of the diversion tube 700. The opening-closing baffle 810 is rotatably arranged at the end relatively close to the first outlet 120 of the diversion tube 700 through the connecting shaft. Specifically, the connecting shaft can be arranged on the reinforcing rib 720.

In some embodiments, the opening-closing baffle 810 has elasticity. The first side of the opening-closing baffle 810 is fixed on the upper side of the end relatively close to the first outlet 120 of the diversion tube 700, and the second side can abut on or separate from the lower side of the end relatively close to the first outlet 120 of the diversion tube 700 to open or close the first inlet 110.

Specifically, when the water cleaner 10 is in a non-operating state and there is no sewage flowing towards the housing 100 through the first inlet 110, the second side of the opening-closing baffle 810 can abut on the lower side of the end relatively close to the outlet 120 of the diversion tube 700 under its own elastic force to block the inlet 110, so as to realize the close of the inlet 110 by the opening-closing baffle 810. When the water cleaner 10 is working, and there is sewage flowing into the housing 100 through the first inlet 110, the sewage can overcome the elastic force of the opening-closing baffle 810 and burst through the opening-closing baffle 810, so that the second side of the opening-closing baffle 810 and the lower side of the end close to the first outlet 120 of the diversion tube 700 are separated, thereby realizing the opening of the first inlet 110 by the opening-closing baffle 810.

In some embodiments, when a reinforcing rib 720 is provided on the upper side of the end relative close to the first outlet 120 of the diversion tube 700, the first side of the opening-closing baffle 810 can be fixed on the reinforcing rib 720, so as to realize that the first side of the opening-closing baffle 810 is fixed stably to the upper side of the end relatively close to the first outlet 120 of the diversion tube 700.

It should be noted that, in this embodiment, when the driving part 310 is working and the sewage is flowing into the housing 100 through the first inlet 110, the driving part 310 can drive the impeller 320 to rotate in the axial direction of the rotating shaft 312, so that the impeller 320 generates centrifugal force. The centrifugal force of the impeller 320 helps the sewage overcome the elastic force or gravity of the opening-closing baffle 810 to open the opening-closing baffle 810, so as to realize the fast opening of the first inlet 110.

The technical features of the above embodiments can be combined arbitrarily, and as long as there is no contradiction in a combination of these technical features, such a combination should be considered to fall within the scope of this application.

Described above are merely preferred embodiments of the disclosure, which are not intended to limit the scope of the application. It should be noted that any variations, modifications and improvements made by those of ordinary skill in the art without departing from the spirit of the application should fall within the scope of the application defined by the appended claims.

What is claimed is:

1. A water cleaner, comprising:
a housing;
a filter mechanism; and
an impeller assembly;
wherein one end of the housing is provided with a first inlet, and an other end of the housing is provided with a first outlet;
the filter mechanism is arranged in the housing; a first end and/or an outer circumference of the filter mechanism is provided with a second inlet, and a second end of the filter mechanism is provided with a second outlet sewage to be treated flows into the housing through the first inlet and flows toward the filter mechanism to be filtered to obtain a clean water; the clean water flows into an interior of the filter mechanism through the second inlet, such that dirt in the sewage is accommodated in a space of the housing outside the filter mechanism, and then the clean water passes through the second outlet and the first outlet in sequence to flow out of the housing; the first end of the filter mechanism is an end close to the first inlet, and the second end of the filter mechanism is an end close to the first outlet;
the filter mechanism comprises a support cylinder and a filter cartridge; a first end and/or an outer circumference of the support cylinder is provided with the second inlet, and a second end of the support cylinder is provided with the second outlet the filter cartridge is arranged around an area of the support cylinder provided with the second inlet; the sewage to be treated flows toward the filter cartridge to be filtered by the filter cartridge to obtain the clean water; the clean water flows into the support cylinder through the second inlet; the first end of the support cylinder is an end of the support cylinder close to the first inlet; and the second end of the support cylinder is an end of the support cylinder close to the first outlet;
the impeller assembly is arranged in the housing, and is located between the support cylinder and the first outlet the impeller assembly is configured to suck the sewage to be treated such that the sewage to be treated flows into the housing through the first inlet and flows towards the filter cartridge; and the impeller assembly is also configured to suck the clean water to allow the clean water to flow out of the support cylinder through the second outlet;
the impeller assembly comprises a driving part and an impeller; the driving part is arranged in the housing, and is provided with a rotating shaft the impeller is arranged on the rotating shaft; and the driving part is configured to drive the impeller to rotate with respect to an axial direction of the rotating shaft through the rotating shaft, so that the impeller generates a centrifugal force for sucking the sewage to be treated and the clean water;

the housing comprises a first housing, a second housing and an auxiliary part; a first accommodating cavity is provided in the first housing, and a second accommodating cavity is provided in the second housing; the first housing is connected with the second housing through the auxiliary part, and the first accommodating cavity is separated from the second accommodating cavity by the auxiliary part; an end of the first housing away from the second housing is provided with the first inlet and an end of the second housing away from the first housing is provided with the first outlet; the filter mechanism is arranged in the first accommodating cavity; a main body of the driving part is arranged at a side of the auxiliary part facing the second accommodating cavity; the rotating shaft of the driving part passes through the auxiliary part and extends into the first accommodating cavity; the impeller is arranged in the first accommodating cavity; the auxiliary part is provided with a through hole communicating the first accommodating cavity and the second accommodating cavity; and when the driving part drives the impeller to rotate, the sewage to be treated is sucked to flow into the first accommodating cavity through the first inlet and flow towards the filter cartridge to be filtered to obtain the clean water; the clean water passes through the second outlet, a gap of the impeller and the through hole in sequence to flow into the second accommodating cavity, and then flows out through the first outlet.

2. The water cleaner of claim 1, further comprising:
a water-retaining assembly;
wherein the water-retaining assembly is arranged in the first accommodating cavity, and encloses the impeller and the rotating shaft; and the water-retaining assembly is configured to block the sewage to be treated in the first accommodating cavity from flowing towards the impeller.

3. The water cleaner of claim 2, wherein the water-retaining assembly comprises a first water-retaining component and a second water-retaining component connected with each other; an end of the first water-retaining component away from the second water-retaining component is connected with the second end of the support cylinder; the first water-retaining component is arranged surrounding the impeller; an end of the second water-retaining component connected to the first water-retaining component is provided with a first water connection port; the first water connection port is communicated with the gap of the impeller; an end of the second water-retaining component away from the first water-retaining component is provided with a second water connection port; the second water connection port is communicated with the through hole; and the second water-retaining component is configured for guiding transportation of the clean water between the gap of the impeller and the through hole.

4. The water cleaner of claim 1, wherein an end of the housing away from the first outlet is bent inward and extends to form a diversion tube.

5. The water cleaner of claim 4, wherein an auxiliary cavity is formed between the diversion tube and an inner side wall of the housing, and is configured to accommodate dirt in the sewage to be treated.

* * * * *